United States Patent
Yang et al.

(10) Patent No.: US 8,768,324 B2
(45) Date of Patent: Jul. 1, 2014

(54) METHOD OF CONFIGURING BLUETOOTH SIM ACCESS PROFILE OF COMMUNICATION DEVICE

(75) Inventors: Lin-Hao Yang, New Taipei (TW); Yu Wang, Beijing (CN)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 386 days.

(21) Appl. No.: 13/210,385

(22) Filed: Aug. 16, 2011

(65) Prior Publication Data
US 2013/0023255 A1    Jan. 24, 2013

(30) Foreign Application Priority Data
Jul. 19, 2011    (CN) .......................... 2011 1 0202400

(51) Int. Cl.
| | |
|---|---|
| *H04B 7/00* | (2006.01) |
| *H04M 3/00* | (2006.01) |
| *H04W 4/00* | (2009.01) |
| *H04B 1/38* | (2006.01) |
| *H04M 1/00* | (2006.01) |

(52) U.S. Cl.
USPC .... 455/418; 455/41.2; 455/432.1; 455/556.1; 455/557; 455/558

(58) Field of Classification Search
USPC ............. 455/41.2, 418–420, 500, 517, 550.1, 455/551, 556.1–556.2, 557–559, 410–411, 455/432.1, 432.3, 434, 435.1–435.3, 455/436–444, 448, 508, 552.1, 455/569.1–569.2; 379/433.09
See application file for complete search history.

(56) References Cited

U.S. PATENT DOCUMENTS

| | | | |
|---|---|---|---|
| 7,957,729 B2* | 6/2011 | Roter et al. ................ 455/422.1 |
| 8,185,156 B2* | 5/2012 | Camilleri et al. ............. 455/558 |
| 2002/0177410 A1* | 11/2002 | Klein et al. ..................... 455/41 |
| 2004/0142684 A1 | 7/2004 | Ratert |
| 2007/0004457 A1* | 1/2007 | Han .............................. 455/558 |
| 2007/0184858 A1* | 8/2007 | Landschaft et al. .......... 455/466 |
| 2008/0182570 A1* | 7/2008 | Kuhl .......................... 455/422.1 |
| 2011/0081951 A1* | 4/2011 | Hwang ......................... 455/558 |
| 2011/0296495 A1* | 12/2011 | Smeets ............................. 726/4 |
| 2012/0302290 A1* | 11/2012 | Tsai et al. ..................... 455/558 |

FOREIGN PATENT DOCUMENTS

DE    20 2010 005 832 U1    9/2010

* cited by examiner

*Primary Examiner* — Meless Zewdu
(74) *Attorney, Agent, or Firm* — Winston Hsu; Scott Margo (57) ABSTRACT

A method of configuring a Bluetooth SIM access profile (SAP) of a communication device is provided, wherein the communication device is coupled to a plurality of SIM cards, and the method comprises: connecting the communication device with a target communication device according to a Bluetooth protocol; and executing an automated operation. Further, the automated operation comprises: detecting a connection status of at least one of SIM card of the SIM cards, and accordingly generating a checking result; and configuring the Bluetooth SAP of the Communication device to use a specific SIM card selected from the plurality of SIM cards according to at least the checking result.

21 Claims, 5 Drawing Sheets

METHOD OF CONFIGURING BLUETOOTH SIM ACCESS PROFILE OF COMMUNICATION DEVICE

BACKGROUND

Embodiments of the present invention generally relate to Bluetooth, and more particularly, to a method of configuring Bluetooth SIM access profile to use one of several SIM cards of a multi-SIM communication device.

Bluetooth SIM Access Profile (SAP) is a wireless interface specification for Bluetooth-based communication between devices, which is developed by Bluetooth Special Interest Group (SIP). The Bluetooth SAP allows devices such as car phones with built-in GSM transceivers to connect to a SIM card in a phone with Bluetooth, and thus the car phone itself does not need a dedicated SIM card. Accordingly, the car phone is allowed to use identification and communication functions of the remote SIM card.

Sometimes, one mobile phone may be equipped with more than one SIM cards, such as a dual-SIM phone or a multi-SIM phone. When the Bluetooth SAP is applied to this type of phones, the configuration of the Bluetooth SAP becomes a problem. That is, a user has to operate the multi-SIM phone to select a SIM card from several SIM cards so that the car phone can access the selected SIM card. However, this operation may be complicated and difficult for the user, and the user may therefore select an improper SIM card for the Bluetooth SAP such that the car phone cannot correctly access the SIM card with Bluetooth SAP.

SUMMARY OF THE INVENTION

The purpose and advantages of the present invention will be set forth in and apparent from the description that follows, as well as will be learned by practice of the invention.

It is therefore an object of the present invention to provide a method of configuring a Bluetooth SIM access profile (SAP) of a communication device which is coupled to a plurality of SIM cards. The inventive method utilizes an automatic selection mechanism to select the most suitable SIM card from the plurality of SIM cards for the configuration of Bluetooth SAP.

According to a first exemplary embodiment of the present invention, a method of configuring a Bluetooth SIM access profile (SAP) of a communication device is provided, where the communication device is coupled to a plurality of SIM cards. The method comprises connecting the communication device with a target communication device according to a Bluetooth protocol; and executing an automated operation. Further, the automated operation comprises steps of: detecting a connection status of at least one of the SIM cards, and accordingly generating a checking result; and configuring the Bluetooth SAP of the communication device to use a specific SIM card selected from the plurality of SIM cards according to at least the checking result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . ." The terms "couple" and "coupled" are intended to mean either an indirect or a direct electrical connection. Thus, if a first device couples to a second device, that connection may be through a direct electrical connection, or through an indirect electrical connection via other devices and connections.

An object of this invention is to provide an approach for selecting the most suitable SIM card from a plurality of SIM card installed in a communication device, such as a mobile phone and a card reader, for configuring the Bluetooth SAP to provide identification and communication functions for a target device, for example an in-vehicle communication device (e.g. car phone). Hence, the present invention detects a connection status representing at least one of accessibility, idle state, and roaming state of SIM cards. The concept of the present invention will be explained with reference to several different exemplary flow charts in the following. Please note that, provided the result is substantially the same, the steps shown in the flow charts are not limited to be executed according to the exact order shown in figures. Additionally, only the steps pertinent to the present invention are shown in figures, and thus there may be some possible steps that can be added into the following flow charts in practical implementation, which does not change the purposes and advantages of this invention.

According to a first exemplary embodiment of the invention, an inventive method is provided to configure a Bluetooth SIM access profile (SAP) of a communication device, where the communication device is coupled to a plurality of SIM cards. The inventive method firstly establishes a Bluetooth connection between devices, and then executes an automated operation in order to configure the Bluetooth SAP. The inventive method comprises steps 110-160 as shown in a flow chart of in FIG. 1.

Figure 1:
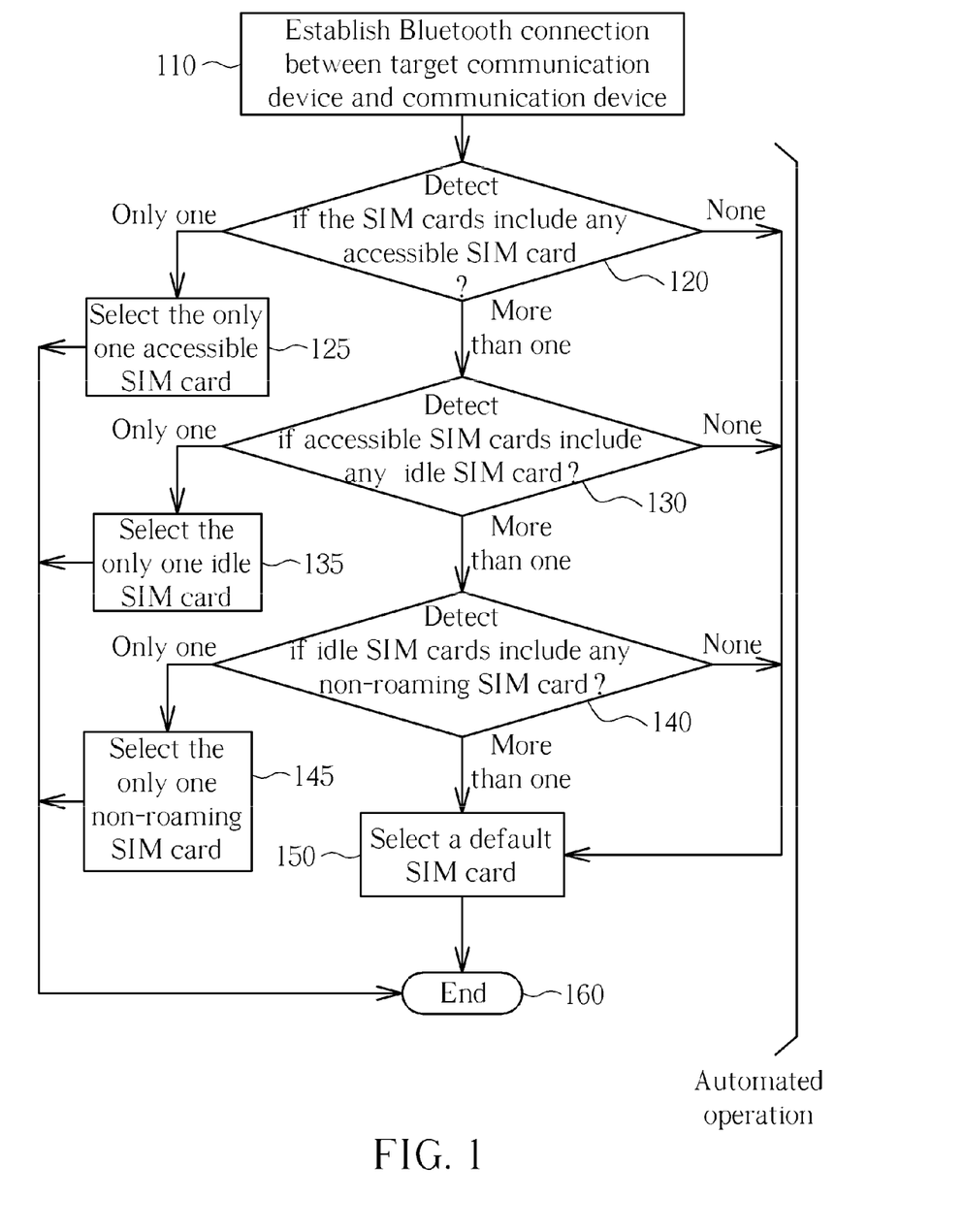
FIG. 1 is a flow chart of an inventive method according to a first exemplary embodiment of the present invention.

Refer to FIG. 1. First, step 110 starts this flow, establishing connection between an in-vehicle communication device (e.g. car phone) and a communication device (e.g. mobile phone or card reader) through BT protocol, and in step 120, BT SAP server of the communication device detects a connection status (which may represent at least one of accessibility, idle state, and roaming state) of the plurality of SIM cards, and accordingly generating a checking result. To detect which one of the plurality of SIM cards is accessible, it is checked that whether a SIM card and a corresponding SIM slot are in bad contact, a SIM card malfunctions, no SIM card plugged, or a SIM slot malfunctions. Such abnormality cause the SIM card to be inaccessible and may be repaired by replacing the SIM card or re-plugging the SIM card into the SIM slot. When the checking result indicates that none of the plurality of SIM cards is accessible, the flow goes to step 150, where a default SIM card will be selected as a specific SIM card. Then, the Bluetooth SAP is configured to provide identification and communication functions of the specific SIM card for the car phone, and then the flow ends in step 160. Further, if the checking result indicates only one of the plurality of SIM cards is accessible, the flow goes to step 125, where the only one accessible SIM card will be selected as the specific SIM card which the Bluetooth SAP is configured to utilize.

However, if the checking result indicates that more than one of the plurality of SIM cards is accessible, meaning that there are several SIM cards available for selection. Therefore, the present invention further checks a working state of each of the accessible of SIM cards. That is, the flow will go to step 130, and it is detected if accessible SIM cards include any idle SIM card, and accordingly generating the checking result. In particular, if the communication device utilizes the SIM card for executing some operations, such as sending/receiving messages, initializing, loading messages, processing data transmission, making a call, or the like, the SIM card will not be recognized as idle. In this way, the non-idle SIM card will be not utilized by Bluetooth SAP since it is certainly unable to provide the identification and communication functions for the in-vehicle communication device.

When the checking result indicates that none of the accessible SIM cards is idle, the flow goes to step 150, where a default SIM card will be selected as a specific SIM card. Then, the Bluetooth SAP is configured to utilize the selected specific SIM card to provide the identification and communication functions for the car phone. Accordingly, the flow will end in step 160. Further, if the second checking result indicates only one of the accessible cards is idle, the flow goes to step 135, where the only one idle SIM card will be selected as the specific SIM card such that the Bluetooth SAP is configured to utilize the only one idle SIM card.

However, if the checking result indicates that more than one of the accessible SIM cards is idle, meaning that there are still several SIM cards available for configuring the Bluetooth SAP. Therefore, the present invention needs to further check a roaming state of each of the idle of SIM cards. That is, the flow will go to step 140, and it is detected if idle SIM cards include any idle SIM card operating in a non-roaming state, and accordingly generating the checking result. This is because that when the SIM card is operating in a roaming state, additional roaming fees will be charged. To avoid the roaming fees, the present invention excludes all the SIM cards operating in the roaming state if possible, and thus the non-roaming SIM card will be selected as the specific SIM card for the Bluetooth SAP. However, if all of the idle SIM cards are roaming, the default SIM card will be selected.

When the checking result indicates that none of the idle SIM cards is operated in the roaming state (i.e., all of the SIM cards are roaming) or more than one of the idle SIM cards is operating in the non-roaming state, the flow goes to step 150, where the default SIM card will be selected as the specific SIM card. Then, the Bluetooth SAP is configured to utilize the specific SIM card to provide the identification and communication functions. Accordingly, the flow will end in step 160. Further, if the checking result indicates only one of the idle cards is operating in the non-roaming state, the flow goes to step 145, where the only one non-roaming SIM card will be selected as the specific SIM card such that the Bluetooth SAP is configured to utilize the only one non-roaming SIM card.

Figure 2:
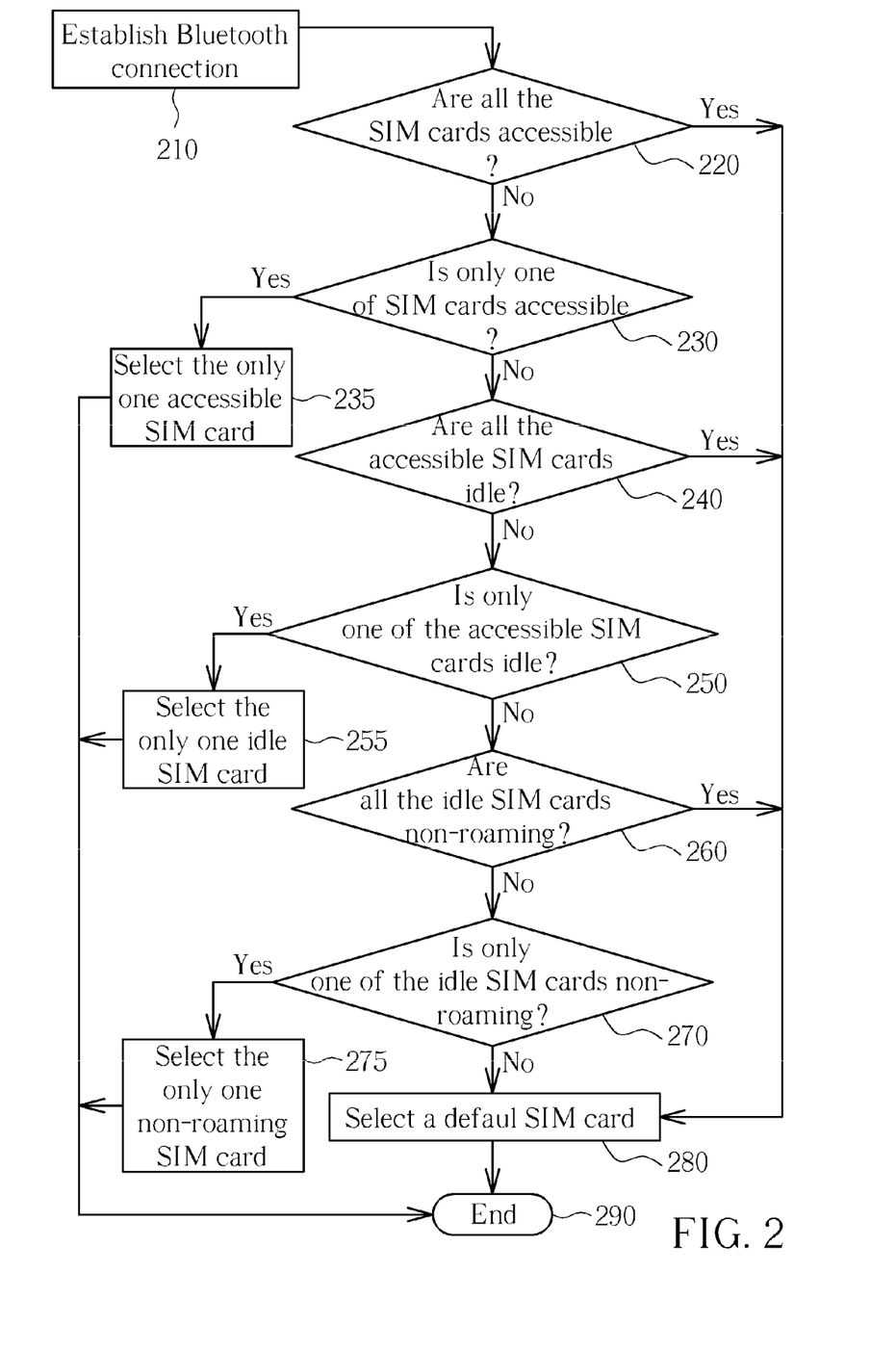
FIG. 2 is a flow chart of an inventive method modified according to the first exemplary embodiment as shown in FIG. 1.

Another exemplary embodiment based on the first exemplary embodiment of the inventive method is illustrated in FIG. 2, which is similar as the flow shown in FIG. 1, and thus the detailed description pertinent to FIG. 2 is omitted here. Refer to FIG. 2. The flow starts at step 210 (where a Bluetooth connection is established between the communication device and the target device). Then, in step 220, it is checked if all the SIM cards are accessible. If so, the flow goes to step 280, selecting a default SIM card; otherwise, it is further checked if only one of SIM cards is accessible in step 230. If there is only one of SIM cards accessible, the flow will go to step 235, selecting the only one accessible SIM card. If there is more than one of the SIM cards accessible, the flow goes to step 240, checking if all the accessible SIM cards are idle. If so, the flow goes to step 280, selecting the default SIM card; otherwise, it is further checked if only one of the accessible SIM cards is idle in step 250. If there is only one of accessible SIM cards idle, the flow will go to step 255, selecting the only one idle SIM card. However, if there is more than one of the accessible SIM cards idle, the flow goes to step 260, checking if all the idle SIM cards are non-roaming. If so, the flow goes to step 280, selecting the default SIM card; otherwise, it is further checked if only one of the idle SIM cards is non-roaming idle in step 270. If there is only one of SIM cards accessible, the flow will go to step 275, selecting the only one idle SIM card; otherwise, the flow goes to step 280 and ends, which still select the default SIM card. This exemplary embodiment is especially suitable for the communication device having dual SIM cards installed therein, which can properly select one SIM card from the two installed SIM card.

According to a second exemplary embodiment of the invention, an inventive method is provided to configure a Bluetooth SAP of a communication device, where the communication device is coupled to a plurality of SIM cards. The inventive method of the second exemplary embodiment executes an automated operation. The inventive method includes step 310 of establishing a Bluetooth connection between the communication device and the target device and an automated operation having steps 320-350 as shown in a flow chart of in FIG. 3. Compared to the first exemplary set forth above, the inventive method according to the second exemplary embodiment does not check the accessibility of the plurality of SIM cards; instead, it checks idle and roaming states of the SIM cards.

Figure 3:
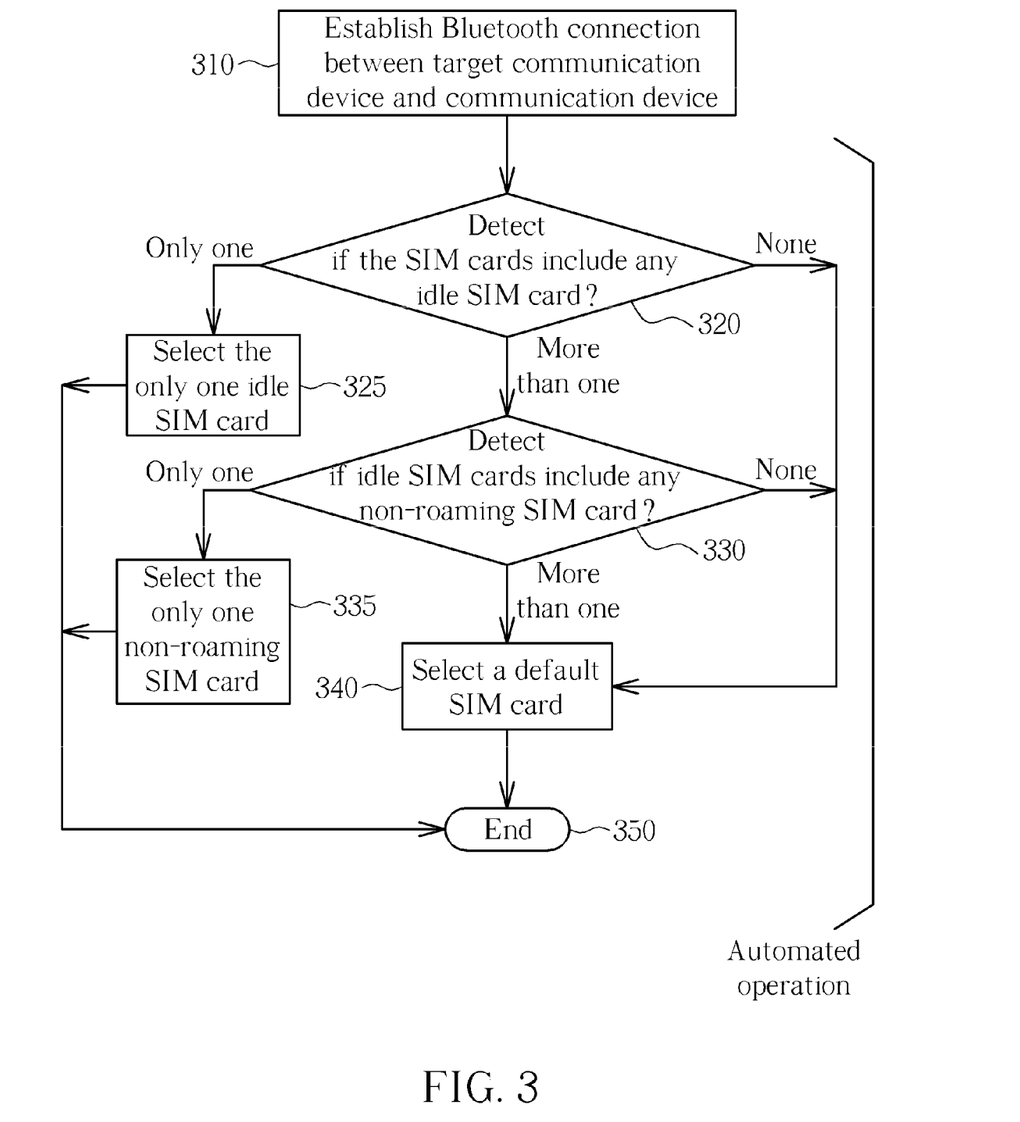
FIG. 3 is a flow chart of an inventive method according to a second exemplary embodiment of the present invention.

Refer to FIG. 3. First, step 310 starts this flow, establishing BT connection between an in-vehicle communication device (e.g. car phone) and a communication device (e.g. mobile phone or card holder), and then in step 320, BT SAP server detects if the plurality of SIM cards include any idle SIM card, and accordingly generating a checking result. When the checking result indicates that none of the plurality of SIM cards is idle, the flow goes to step 350, where a default SIM card will be selected as a specific SIM card. Then, the Bluetooth SAP is configured to provide the identification and communication functions of the specific SIM card for a car phone, and then the flow ends in step 360. Further, if the checking result indicates only one of the plurality of SIM cards is idle, the flow goes to step 325, where the only one idle SIM card will be selected as the SIM card which the Bluetooth SAP is configured to utilize.

However, if the checking result indicates that more than one of the plurality of SIM cards is idle, meaning that there are several SIM cards available for selection. Therefore, the BT SAP server further checks the roaming state of each of the idle of SIM cards in order to avoid the additional roaming fees. That is, the flow will go to step 330, and it is detected if idle SIM cards include any SIM card operating in the non-roaming state, and accordingly generating the checking result.

When the checking result indicates that none of the idle SIM cards operating state, the flow goes to step 350, where the default SIM card will be selected as a specific SIM card. Then, the Bluetooth SAP is configured to utilize the specific SIM card to provide the identification and communication functions for the car phone. Accordingly, the flow will end in step 360. Further, if the checking result indicates only one of the idle cards is operating in the non-roaming state, the flow goes to step 335, where the only one non-roaming SIM card will be selected as the specific SIM card such that the Bluetooth SAP is configured to utilize to the selected specific SIM card.

However, if the checking result indicates that more than one of the idle SIM cards is operating in the non-roaming state, meaning that there are several SIM cards available for configuring the Bluetooth SAP. Therefore, the BT SAP server directly selects the default SIM card (step 350), and no other selecting will be further made such that the flow will end in step 360.

According to a third exemplary embodiment of the invention, an inventive method is provided to configure a Bluetooth SAP of a communication device, where the communication device is coupled to a plurality of SIM cards. The inventive method according to the third exemplary embodiment also executes an automated operation. The inventive method includes step 410 and an automated operation having steps 420-440 as illustrated in a flow chart of FIG. 4. Compared to the first and the second exemplary embodiments set forth above, the inventive method according to the third exemplary embodiment does not check the accessibility and the idle states of the plurality of SIM cards, and checks only the roaming states of the SIM cards.

Figure 4:
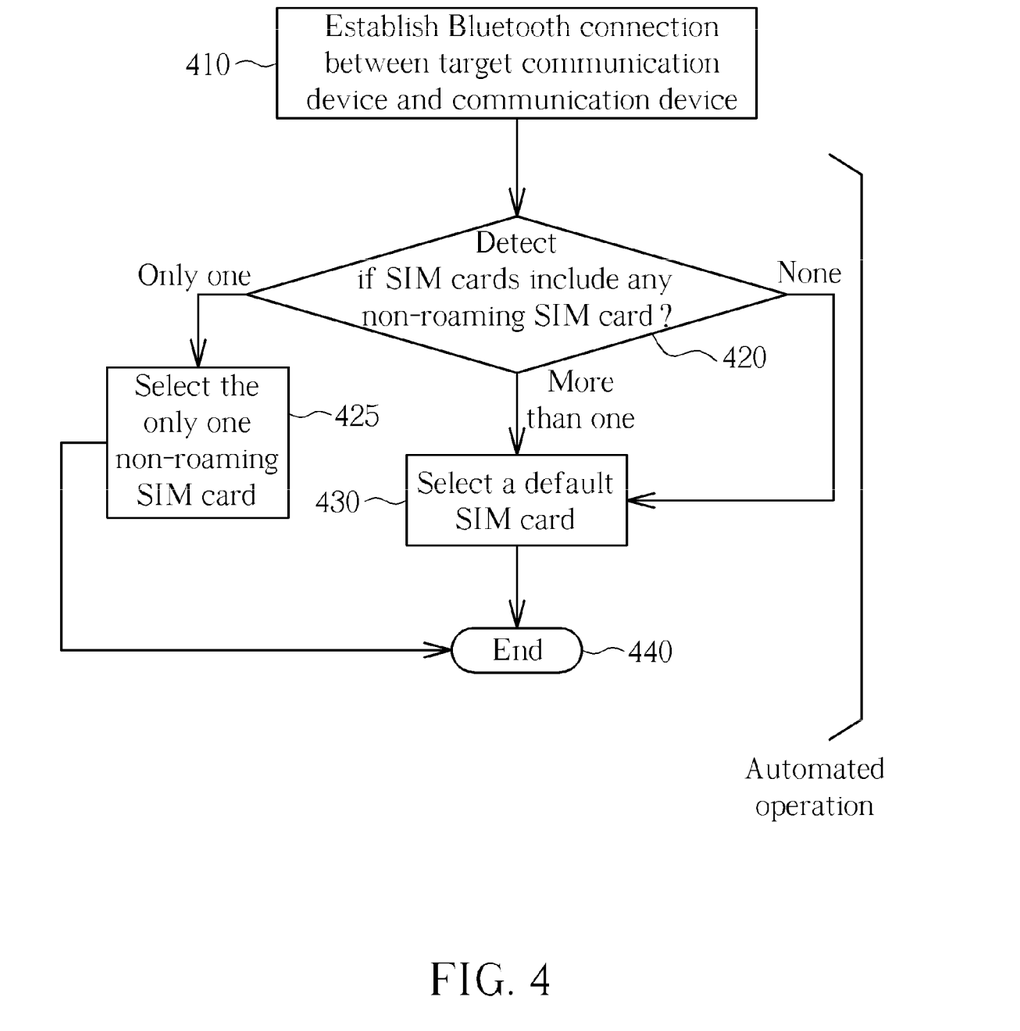
FIG. 4 is a flow chart of an inventive method according to a third exemplary embodiment of the present invention.

Refer to FIG. 4. First, step 410 starts this flow, establishing BT connection between an in-vehicle communication device (e.g. car phone) and a communication device (e.g. mobile phone or card holder), and then in step 420, the BT SAP server detects that if the plurality of SIM cards include any SIM card operating in the non-roaming state, and a checking result is accordingly generated. When the checking result indicates that none of the plurality of SIM cards is operating in the non-roaming state, the flow goes to step 430, where the default SIM card will be selected as a specific SIM card. Then, the Bluetooth SAP is configured to provide the identification and communication functions of the specific SIM card for the car phone, and then the flow ends in step 440. Further, if the checking result indicates only one of the plurality of SIM cards is operating the non-roaming state, the flow goes to step 425, where the only one non-roaming SIM card will be selected as the specific SIM card which the Bluetooth SAP is configured to utilize.

Figure 5:
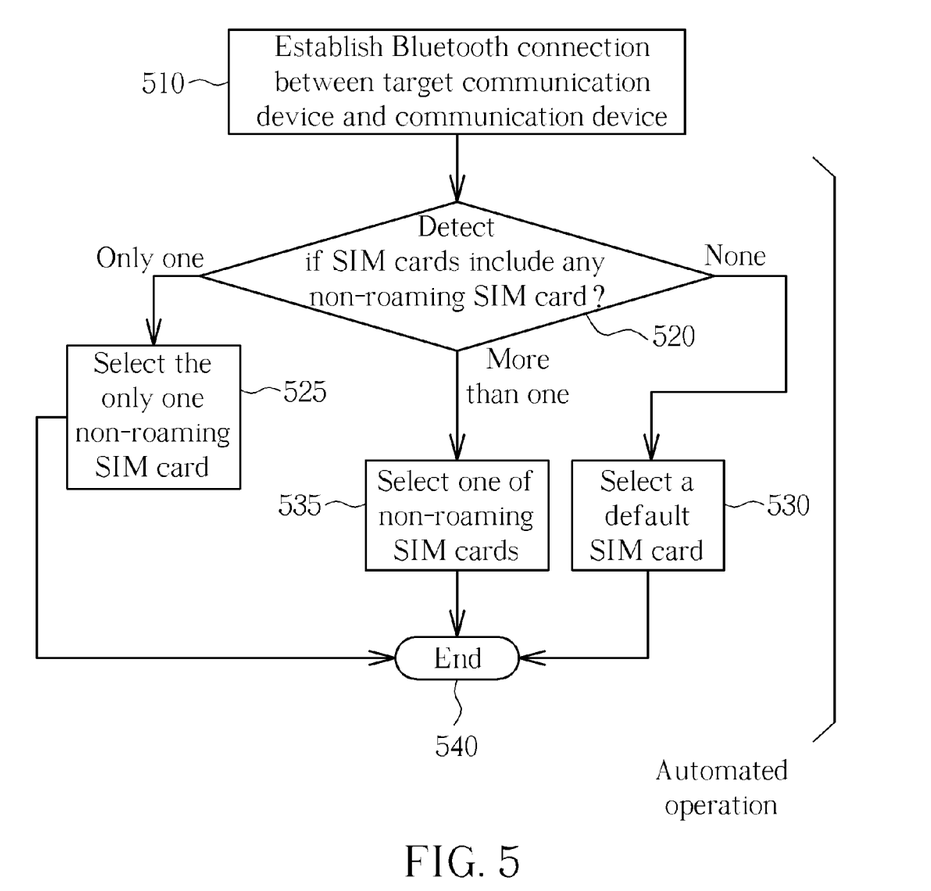
FIG. 5 is a flow chart of an inventive method modified according to the third exemplary embodiment as shown in FIG. 4.

However, if the checking result indicates that more than one of the plurality of SIM cards is non-roaming, the flow will go to step 430, selecting the default SIM card as the specific SIM card, and then the default SIM is used by the Bluetooth SAP for providing the identification and communication functions. According to other exemplary embodiments of the present invention, if the checking result indicates that more than one of the plurality of SIM cards is non-roaming, the BT SAP server may select one of the non-roaming SIM cards as the specific SIM card. Such exemplary embodiment of the present invention is illustrated in a flow chart of FIG. 5. As can be seen from FIG. 5, operations of steps 510, 520, 525, 530, and 540 are similar as steps 410, 420, 425, 430, and 440. However, the only difference between these two embodiments is step 535, where one of the non-roaming SIM cards is selected as the specific SIM card to be used by the Bluetooth SAP when the checking result indicates there are more than one SIM cards non-roaming. It should be noted that although this alternative implementation is introduced in the exemplary embodiment shown in FIG. 5, it is, however, possible to incorporate such feature into the above-mentioned first and second exemplary embodiments of the present invention. For example, if in step 140 of the first exemplary embodiment the checking result indicates the idle SIM cards include more than one non-roaming SIM cards, one of the non-roaming SIM cards rather than the default SIM card will be selected as the specific SIM card for providing the identification and communication functions. This alternative implementation may be also utilized for modify the flow of second exemplary embodiment of this invention, which also falls within the scope of the present invention.

According to a fourth exemplary embodiment of the present invention, it is also possible not to check all of the SIM cards. For example, the BT SAP server may only check for the accessibility of one SIM card in a dual SIM case. Once the checked SIM card is found un-accessible, the BT SAP server will select another SIM card except the checked card as the specific SIM card without checking the another SIM card.

For realizing the automated operation of the inventive method to configure the Bluetooth SAP, an embodiment of the invention may include functionality that may be implemented as software executed by a processor, hardware circuits or structures, or a combination of both in a multi-SIM phone. The processor may be a general-purpose or dedicated processor. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment. Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

In conclusion, the present invention provides an effective approach of automatically selecting a SIM card from a dual SIM or multi SIM communication device (e.g. a mobile phone) to provide the identification and communication functions for an in-vehicle communication device (e.g. a car phone) according to the Bluetooth SAP.

Those skilled in the art will readily observe that numerous modifications and alterations of the device and method may be made while retaining the teachings of the invention.

What is claimed is:

1. A method of configuring a Bluetooth SIM access profile (SAP) of a communication device, the communication device being connected to a plurality of SIM cards, the method comprising:
connecting the communication device with a target communication device according to a Bluetooth protocol; and
executing an automated operation, comprising steps of:
generating a checking result by detecting connection status of the plurality of SIM cards; and
configuring the Bluetooth SAP of the communication device to use a specific SIM card selected from the plurality of SIM cards according to at least the checking result, comprising:
when the checking result indicates that more than one of the plurality of SIM cards is accessible:
referring to at least one of the idle state and the roaming state of the accessible SIM cards indicated by the checking result to configure the Bluetooth SAP of the communication device to use the specific SIM.

2. The method of claim 1, wherein the connection status represents at least one of accessibility, idle state, and roaming state of the SIM card.

3. The method of claim 2, wherein the step of configuring the Bluetooth SAP of the communication device comprises:
when the checking result indicates that the at least one of SIM cards is not accessible, selecting a SIM card except the at least one SIM card as the specific SIM card without checking the selected SIM card.

4. The method of claim 1, wherein the step of configuring the Bluetooth SAP of the communication device comprises:
when the checking result indicates that none of the plurality of SIM cards is accessible, selecting a default SIM card as the specific SIM card.

5. The method of claim 1, wherein the step of configuring the Bluetooth SAP of the communication device comprises:
when the checking result indicates only one of the plurality of SIM cards is accessible, selecting the only one accessible SIM card as the specific SIM card.

6. The method of claim 1, wherein the step of referring to at least one of the idle state and the roaming state of the accessible SIM cards to use the specific SIM card comprises:
when the checking result indicates that none of the accessible SIM cards is idle, selecting a default SIM card as the specific SIM card.

7. The method of claim 1, wherein the step of referring to at least one of the idle state and the roaming state of the accessible SIM cards to use the specific SIM card comprises:
when the checking result indicates only one of the accessible SIM cards is idle, selecting the only one idle SIM card as the specific SIM card.

8. The method of claim 1, wherein the step of referring to at least one of the idle state and the roaming state of the accessible SIM card to use the specific SIM card comprises:
when the checking result indicates that more than one of the accessible SIM cards is idle:
referring to the roaming state of the idle SIM cards indicated by the checking result to configure the Bluetooth SAP of the communication device to use the specific SIM card.

9. The method of claim 8, wherein the step of referring to the roaming state of the idle SIM cards indicated by the checking result to use the specific SIM card comprises:
when the checking result indicates that none of the idle SIM cards is operating in the non-roaming state or more than one of the idle SIM cards is operating in the non-roaming state, selecting a default SIM card as the specific SIM card.

10. The method of claim 8, wherein the step of referring to the roaming state of the idle SIM cards indicated by the checking result to use the specific SIM card comprises:
when the checking result indicates that more than one of the idle SIM cards is operating in the non-roaming state, selecting a specific idle SIM card from idle SIM cards operating in the non-roaming state as the specific SIM card.

11. The method of claim 8, wherein the step of referring to the roaming state of the idle SIM cards indicated by the checking result to use the specific SIM card comprises:
when the checking result indicates only one of the idle SIM cards is operating in the non-roaming state, selecting the only one non-roaming SIM card as the specific SIM card.

12. The method of claim 1, wherein the step of configuring the Bluetooth SAP of the communication device comprises:
when the checking result indicates that none of the plurality of SIM cards is idle, selecting a default SIM card as the specific SIM card.

13. The method of claim 1, wherein the step of configuring the Bluetooth SAP of the communication device comprises:
when the checking result indicates only one of the plurality of SIM cards is idle, selecting the only one idle SIM card as the specific SIM card.

14. The method of claim 1, wherein the step of configuring the Bluetooth SAP of the communication device comprises:
when the checking result indicates that more than one of the SIM cards is idle:
referring to the accessibility or roaming state of the idle SIM cards indicated by the checking result to configure the Bluetooth SAP of the communication device to use the specific SIM card.

15. The method of claim 1, wherein the step of configuring the Bluetooth SAP of the communication device comprises:
when the checking result indicates that none of the plurality of SIM cards is operating in a non-roaming state, selecting a default SIM card as the specific SIM card.

16. The method of claim 1, wherein the step of configuring the Bluetooth SAP of the communication device comprises:
when the checking result indicates only one of the plurality of SIM cards is operating in a non-roaming state, selecting the only one non-roaming SIM card as the specific SIM card.

17. The method of claim 1, wherein the target communication device is an in-vehicle communication device, and the specific SIM card of the communication device is accessed by the in-vehicle communication device.

18. A method of configuring a Bluetooth SIM access profile (SAP) of a communication device, the communication device being connected to a plurality of SIM cards, the method comprising:
connecting the communication device with a target communication device according to a Bluetooth protocol; and
executing an automated operation, comprising steps of:
generating a checking result by detecting the connection status of the plurality of SIM cards; and
when the checking result indicates that more than one of the plurality of SIM cards is accessible, referring to an idle state and a roaming state of the accessible SIM cards indicated by the checking result to configure the Bluetooth SAP of the communication device to use a specific SIM card;

when the checking result indicates that more than one of the accessible SIM cards is idle, referring to the roaming state of the idle SIM cards indicated by the checking result to configure the Bluetooth SAP of the communication device to use the specific SIM card.

19. The method of claim 18, wherein the step of referring to the roaming state of the idle SIM cards indicated by the checking result to use the specific SIM card comprises:

when the checking result indicates that none of the idle SIM cards is operating in the non-roaming state or more than one of the idle SIM cards is operating in the non-roaming state, selecting a default SIM card as the specific SIM card.

20. The method of claim 18, wherein the step of referring to the roaming state of the idle SIM cards indicated by the checking result to use the specific SIM card comprises:

when the checking result indicates that more than one of the idle SIM cards is operating in the non-roaming state, selecting a specific idle SIM card from idle SIM cards operating in the non-roaming state as the specific SIM card.

21. The method of claim 18, wherein the step of referring to the roaming state of the idle SIM cards indicated by the checking result to use the specific SIM card comprises:

when the checking result indicates only one of the idle SIM cards is operating in the non-roaming state, selecting the only one non-roaming SIM card as the specific SIM card.

\* \* \* \* \*